United States Patent [19]

Yu Yao

[11] 4,304,761

[45] Dec. 8, 1981

[54] METHOD OF TREATING EXHAUST GASES FROM A METHANOL FUELED INTERNAL COMBUSTION ENGINE

[75] Inventor: Yung-Fang Yu Yao, Dearborn Heights, Mich.

[73] Assignee: Ford Motor Company, Dearborn, Mich.

[21] Appl. No.: 211,484

[22] Filed: Nov. 28, 1980

[51] Int. Cl.$^3$ .............................................. B01D 53/36
[52] U.S. Cl. .................................... 423/213.2; 60/299
[58] Field of Search .............. 423/213.2, 213.5, 245 S; 60/299

[56] References Cited

U.S. PATENT DOCUMENTS

2,664,340 12/1953 Houdry ............................ 423/213.5
3,362,783 1/1968 Lear .................................. 423/213.2

OTHER PUBLICATIONS

"Chem. Abst.", vol. 61, 1964, 2708c.
"Chem. Abst.", vol. 85, 1976, 7725u.

*Primary Examiner*—G. O. Peters
*Attorney, Agent, or Firm*—William E. Johnson; Olin B. Johnson

[57] ABSTRACT

A method of oxidizing that portion of a methanol fuel which has not been burned in an internal combustion engine is disclosed. Briefly, the method includes the following steps. A methanol fuel is burned in an internal combustion engine thereby to produce exhaust gases which contain unburned methanol. The exhaust gases containing the unburned methanol are passed over a catalyst consisting essentially of silver dispersed on a washcoat material. The washcoat material is in turn dispersed on a substrate. In this manner, the unburned methanol is oxidized to carbon dioxide and water without any significant production of aldehydes, ethers or carbon monoxide.

6 Claims, No Drawings

METHOD OF TREATING EXHAUST GASES FROM A METHANOL FUELED INTERNAL COMBUSTION ENGINE

BACKGROUND OF THE INVENTION AND PRIOR ART STATEMENT

Because of the great abundance of coal in the United States, methanol appears to be a fuel which will become attractive in price and abundant in quantity in future years. The reason that methanol will be in great supply is that there are processes for gasifying coal to form products that can be reacted to form methanol fuel.

When methanol is burned in an internal combustion engine, unburned methanol and partial oxidation products of methanol can be found in the exhaust gases. Although the impact of these materials from methanol fueled vehicles on air quality is not yet well defined, I attempted to develop a process for removing unburned methanol from an exhaust gas stream by converting such unburned methanol to carbon dioxide and water.

The method of treating an exhaust gas stream generated by burning methanol fuel in an internal combustion engine is more complicated than treating exhaust gases from a gasoline fueled engine because the methanol fueled engine operates at substantially lower exhaust gas temperatures. Thus, one does not have the contribution of higher thermal activity when attempting to treat exhaust gases from a methanol fueled vehicle.

In eliminating methanol, basically an oxidation reaction is carried out. The following four oxidation reactions are the principal reactions which can occur:

$$CH_3OH + 1.5O_2 = CO_2 + 2H_2O \quad [1]$$

$$CH_3OH + 0.5O_2 = HCHO + H_2O \quad [2]$$

$$2CH_3OH = CH_3-O-CH_3 + H_2O \quad [3]$$

$$CH_3OH + O_2 = CO + 2H_2O \quad [4]$$

Of these reactions, the one that is deemed most desirable is the reaction of equation [1] because this reaction produces the end products of carbon dioxide and water. The reaction of equation [2] results in the production of an aldehyde, whereas an ether is produced by the reaction of equation [3] and carbon monoxide by the reaction of equation [4].

No novelty study was conducted on the subject matter of this specification in the U.S. Patent Office or in any other search facility. I personally am unaware of any other teachings with respect to the treatment of methanol fueled vehicles as I will teach in this specification.

SUMMARY OF THE INVENTION

This invention relates to a method of oxidizing a methanol fuel and, more particularly, to a method of oxidizing that portion of a methanol fuel which has not been burned in an internal combustion engine.

In accordance with the teachings of the method of this invention, the following steps are employed in the oxidizing of unburned methanol fuel. A methanol fuel is burned in an internal combustion engine thereby to produce exhaust gases which contain unburned methanol. In this specification, "a methanol fuel" means a fuel which is substantially methanol in total content. If materials other than methanol are added to the fuel, the chemical dynamics of the entire system change and an entirely new method must be developed for handling the exhaust gases produced.

In accordance with my method, the exhaust gases containing the unburned methanol are passed over a catalyst consisting essentially of silver dispersed on a washcoat material. The washcoat material is in turn dispersed on a substrate. In this manner, the unburned methanol contained in the exhaust gases is oxidized to carbon dioxide and water without the production of any undesirable aldehydes, ethers or carbon monoxide.

In accordance with further detailed teachings of this invention, the catalyst consisting essentially of silver dispersed on a supported washcoat material is thermally aged. This thermal aging takes place at temperatures of up to about 1000° C. and at this temperature for a time up to about six hours. The thermal aging takes place prior to the use of the catalyst in treating exhaust gases from an internal combustion engine burning a methanol fuel.

DESCRIPTION OF THE PREFERRED EMBODIMENT

The novel features that are considered characteristic of the invention are set forth with particularity in the appended claims. The invention itself, however, both as to its organization and its method of operation, together with additional objects and advantages thereof, will best be understood from the following description of the preferred embodiment.

In the United States, coal is an abundant resource. This coal may be gasified in a gasification operation to produce products that can be reacted to form methanol. Methanol, in turn, may be used as a fuel for an internal combustion engine. In such an engine, methanol is oxidized to provide the burning action in the combustion chambers which is effective to develop power within the internal combustion engine.

As with the burning of any fuel, the burning of methanol fuel results in an exhaust gas stream which has some unburned methanol contained therein. As previously stated in the Background of the Invention and Prior Art Statement section of this specification, the unburned methanol found in an exhaust gas stream may be oxidized in one of four prevalent manners which were set forth as equations [1] through [4]. The most desirable way of eliminating unburned methanol from an exhaust gas stream is by means of the reaction defined in equation [1], which produces carbon dioxide and water vapor.

A difficulty encountered in handling exhaust gases from a methanol fueled internal combustion engine is found in the fact that the exhaust gas temperatures are relatively low. In the case of a methanol fueled vehicle, the exhaust temperature is substantially below the exhaust temperature of a gasoline fueled engine.

Following are two tables which show the work I carried out in studying the oxidation of methanol contained in a simulated exhaust gas stream. The symbols $R_1$, $R_2$, $R_3$ and $R_4$ mean reaction 1, reaction 2, reaction 3 and reaction 4 as defined in the Background of the Invention and Prior Art Statement section of this specification.

TABLE 1

$CH_3OH$ Oxidation Over Supported Metal Catalysts[a]

| Catalyst | $H_2O$ Inlet % | $R^b$ T-100 °C. | $R_1{}^c$ T-50 °C. | $R_1{}^c$ T-95 °C. | $R_2$ max % | $R_2$ T(max) °C. | $R_3$ | $R_4$ |
|---|---|---|---|---|---|---|---|---|
| Pt/α-Al$_2$O$_3$ (0.48%) | 0 | 155 | 93 | 170 | 21 | 98 | — | — |
| Pt/γ-Al$_2$O$_3$ (0.22%) | 0 | 125 | 88 | 154 | 23 | 115 | — | — |
|  | 2 | 125 | 96 | 195 | >15[e] | >125[e] | — | — |
| Pd/α-Al$_2$O$_3$ (0.28%) | 0 | 130 | 98 | 124 | 11 | 100 | — | — |
|  | 2 | 170 | 100 | 160 | 6 | 110 | — | — |
| Pd/γ-Al$_2$O$_3$ (0.16%) | 0 | 145 | 90 | 195 | 8 | 120 | — | — |
| Rh/γ-Al$_2$O$_3$ (0.51%) | 0 | 275 | 214 | 260 | 25 | 208 | — | — |
|  | 2 | 290 | 239 | 310 | 18 | 243 | — | — |
| Ag/γ-Al$_2$O$_3$ (6.7%) | 0 | 180 | 130 | 167 | — | — | — | — |
|  | 2 | 185 | 158 | 180 | 3 | 160 | — | — |

[a]Catalysts heated at 800° C. for 6 hours, run at standard conditions; s.v. = 300 Khr$^{-1}$ 1% $O_2$, 0.16% $CH_3OH$
[b]Temperature for 100% conversion of $CH_3OH$
[c]Temperature for 50 and 95% conversion of methanol to $CO_2$
[e]Temperature not low enough to reach the maximum
— not found.

TABLE 2

$CH_3OH$ Oxidation Over Supported Base Metal Oxide Catalysts[a]

| Catalyst | $H_2O$ Inlet % | $R^b$ T-100 °C. | $R_1$ T-50[c] °C. | $R_1$ T-95[c] °C. | $R_2$ max % | $R_2$ T(max) °C. | $R_3$ max % | $R_3$ T(max) °C. | $R_4$ conv.[d] % | $R_4$ T[d] °C. |
|---|---|---|---|---|---|---|---|---|---|---|
| CuO/ZrO$_2$(4.2) | 0 | 360 | 310 | 380 | 3 | 335 | — | — | — | — |
| CuO/γ-Al$_2$O$_3$(11.5%) | 0 | 300 | 244 | 282 | 5 | 202 | — | — | — | — |
|  | 2 | 350 | 270 | 333 | 4 | 240 | — | — | — | — |
| CuCr$_2$O$_4$/ZrO$_2$(11%) | 0 | 320 | 275 | 340 | 27 | 272 | — | — | — | — |
|  | 2 | 342 | 285 | 335 | 10 | 290 | — | — | — | — |
| Co$_3$O$_4$/ZrO$_2$(4.4%) | 0 | 385 | 268 | 395 | 10 | 245 | — | — | — | — |
|  | 2 | 400 | 276 | 400 | 6 | 320 | — | — | — | — |
| Cr$_2$O$_3$/γ-Al$_2$O$_3$(9.5%) | 0 | 342 | 308 | e | 25 | 304 | >6 | >240 | 30 | 400 |
|  | 2 | 368 | 320 | e | 25 | 325 | 4 | 268 | 28 | 400 |
| Cr$_2$O$_3$/ZrO$_2$(5.3%) | 0 | 320 | 275 | 390 | 32 | 270 | — | — | 4 | 420 |
|  | 2 | 335 | 295 | 400 | 19 | 290 | — | — | 5 | 400 |
| Mn$_2$O$_3$/γ-Al$_2$O$_3$(6.7%) | 0 | 430 | 388 | e | 15 | 350 | 14 | 260 | 36 | 440 |
|  | 2 | 450 | 414 | e | 10 | 450 | 2 | 420 | 34 | 460 |
| Mn$_2$O$_3$/ZrO$_2$(5.7%) | 0 | 348 | 260 | 380 | 11 | 270 | — | — | — | — |
|  | 2 | 390 | 297 | 395 | 12 | 325 | — | — | — | — |
| Fe$_2$O$_3$/γ-Al$_2$O$_3$(10%) | 0 | 360 | 365 | e | 18 | 320 | 38 | 265 | 31 | 390 |
|  | 2 | 440 | 415 | e | 3 | 400 | 5 | 330 | 38 | 440 |
| Fe$_2$O$_3$/ZrO$_2$(4.6%) | 0 | e | 352 | e | 21 | 335 | — | — | — | — |
|  | 2 | e | 415 | e | 12 | 380 | — | — | — | — |
| NiO/ZrO$_2$(4.9%) | 0 | e | e | e | 8 | 410 | — | — | 37 | 410 |
| V$_2$O$_5$/γ-Al$_2$O$_3$(3.5%) | 0 | e | e | e | 42 | 410 | 40 | 320 | 33 | 410 |

[a]Catalysts heated at 800° C. 6 hours; run at standard conditions: s.v. = 300Khr$^{-1}$, 1% $O_2$, 0.16% $CH_3OH$
[b]Temperature for 100% conversion of methanol
[c]Temperature for 50 and 95% conversion of methanol to $CO_2$
[d]The highest reaction temperature used and the conversion of methanol to CO at that temperature
[e]Percent of conversion not reached at the highest reaction tempertaure used.
— not found.

Table 1 shows that platinum and palladium are active at a low temperature for eliminating methanol from a gas stream. However, both the platinum and the palladium have an affinity for producing aldehydes in accordance with equation [2] when these materials are used as an oxidation catalyst to eliminate methanol from exhaust gases. Table 1 demonstrates that silver also has a relatively low temperature for 50 and 95% conversion of methanol to $CO_2$ plus the added benefit that there is no significant amount of aldehyde produced and no reaction 3 or reaction 4 components found after the oxidation step has taken place.

Table 2 demonstrates that in almost every case for a base metal oxide catalyst a rather high temperature is required in order to get 50% conversion of methanol to $CO_2$. In all cases tested, some aldehyde components were generated as a result of the oxidation of the methanol.

In accordance with the teachings of the method of this invention, a method of oxidizing that portion of a methanol fuel which has not been burned in an internal combustion engine is carried out in the following manner. The meaning of "a methanol fuel" has been given earlier in this specification.

In accordance with the teachings of my method, a methanol fuel is burned in an internal combustion engine. This burning action produces exhaust gases which contain at least some unburned methanol. These exhaust gases containing the unburned methanol are passed over a catalyst consisting essentially of silver. The silver catalyst is in a finely divided state and is dispersed on a washcoat material. The washcoat material is in turn dispersed on a substrate. In such a manner, the unburned methanol is oxidized to carbon dioxide and water without production of any undesirable aldehydes. The silver catalyst and washcoat material are dispersed in a manner already well known in the art. Therefore, no description of that operation will be contained herein.

There are many washcoat materials known to skilled artisans for application to substrates. Washcoat materials such as gamma alumina, alpha alumina and zirconia are well known washcoat materials. These three washcoat materials are the principal washcoat materials that I recommend using. I would recommend that the washcoat material be gamma alumina. This gamma alumina washcoat material has an extremely large surface area per unit volume when compared to other washcoat materials. Other refractory washcoat materials, however, may be used, depending upon what is most readily available and what is most cost effective in a particular system.

In a catalyst system, I prefer to see from 2% to 15% by weight silver, when compared to the weight of the washcoat placed on the washcoated substrate. Most preferably, about 6% by weight silver per weight of the washcoat should be used.

As an additional matter, I have found that it is best to thermally age the silver containing catalyst system prior to passing the methanol containing exhaust gases thereover. Thermal aging may be carried out by heating the catalyzed substrate, generally in air, to a temperature of no more than about 1000° C. for this temperature for a time of no more than about six hours. The range of thermal aging temperatures can be from 700° C. to 1000° C., with the treatment time from 6 hours to 24 hours, depending upon the aging temperature, the longer times being used for lower aging temperatures. The thermal aging step seems to produce a better catalyst because there seems to be a change that can be attributed to thermally activated migration of silver over its washcoat surface to reach a quasiequilibrium surface concentration.

As an additional matter, depending upon the particular washcoat material used, a washcoat stabilization material may be included in the washcoat composition. Such washcoat stabilization materials are well known in the art. Since stabilization of a washcoat forms no part of this invention, it is assumed that the words "a washcoat material", as used in this specification and in the claims, include not only the principal washcoat element, but also any stabilization material which may be used as a necessary item in its formulation.

While particular embodiments of the invention have been illustrated and described, it will be obvious to those skilled in the art that various changes and modifications may be made without departing from the invention and it is intended to cover in the appended claims all such modifications and equivalents as fall within the true spirit and scope of this invention.

What is claimed is:

1. A method of oxidizing that portion of a methanol fuel which has not been burned in an internal combustion engine, which method comprises the steps of:
   burning a methanol fuel in an internal combustion engine thereby to produce exhaust gases which contain unburned methanol; and
   passing said exhaust gases containing said unburned methanol over a catalyst consisting essentially of silver dispersed on a washcoat material, which washcoat material is dispersed on a substrate, whereby said unburned methanol is oxidized to carbon dioxide and water without production of significant amounts of aldehydes, ethers or carbon monoxide.

2. The method of claim 1, wherein prior to passing any of said exhaust gases containing said unburned methanol over a catalyst consisting essentially of silver dispersed on a washcoat material which is in turn dispersed on a substrate, the step of thermally aging said substrate, washcoat dispersed thereon and silver dispersed on said washcoat in order to induce a thermally activated migration of silver over the washcoat surface to reach a quasiequilibrium surface concentration.

3. The method of claim 2, wherein said washcoat material is gamma alumina.

4. The method of claims 2 or 3, wherein said thermal treatment is at a temperature of about 1000° C. for a time of about six hours.

5. The method of claim 1, wherein said silver is present from 2% to 15% by weight silver when compared to the weight of the washcoat placed on said substrate.

6. The method of claims 2 or 3, wherein said silver is present from 2% to 15% by weight silver when compared to the weight of the washcoat placed on said substrate.

* * * * *